United States Patent
Giammona et al.

(10) Patent No.: US 11,515,566 B2
(45) Date of Patent: Nov. 29, 2022

(54) LIQUID CATHODE FORMULATION FOR RECHARGEABLE METAL HALIDE BATTERY

(71) Applicants: International Business Machines Corporation, Armonk, NY (US); Central Glass Co., Ltd., Tokyo (JP)

(72) Inventors: Maxwell Giammona, Pleasanton, CA (US); Jangwoo Kim, San Jose, CA (US); Young-hye Na, San Jose, CA (US); Masafumi Oda, Asaka (JP); Tsubasa Itakura, Miyoshi (JP); Sho Yamazawa, Fujimino (JP); Katsutoshi Suzuki, Hino (JP); Kazunari Takeda, Tsurugashima (JP)

(73) Assignees: International Business Machines Corporation, Armonk, NY (US); Central Glass Co., Ltd., Tokyo (JP)

( * ) Notice: Subject to any disclaimer, the term of this patent is extended or adjusted under 35 U.S.C. 154(b) by 282 days.

(21) Appl. No.: 16/858,671

(22) Filed: Apr. 26, 2020

(65) Prior Publication Data
US 2021/0336295 A1 Oct. 28, 2021

(51) Int. Cl.
*H01M 10/0568* (2010.01)
*H01M 10/44* (2006.01)
(Continued)

(52) U.S. Cl.
CPC ....... *H01M 10/0568* (2013.01); *H01M 4/661* (2013.01); *H01M 4/663* (2013.01);
(Continued)

(58) Field of Classification Search
CPC ......... H01M 10/0567; H01M 10/0568; H01M 10/0569; H01M 10/058; H01M 10/44;
(Continued)

(56) References Cited

U.S. PATENT DOCUMENTS

| 3,640,770 A | 2/1972 | Zito, Jr. |
| 4,400,453 A | 8/1983 | Blomgren et al. |

(Continued)

FOREIGN PATENT DOCUMENTS

| GB | 2230640 A | 10/1990 |
| JP | 2013161608 A | 8/2013 |

(Continued)

OTHER PUBLICATIONS

International Search Report and Written Opinion dated Jul. 15, 2021, for counterpart PCT/EP2021/058451, filed on Mar. 31, 2021.
(Continued)

*Primary Examiner* — Victoria H Lynch
(74) *Attorney, Agent, or Firm* — Karen Canaan; CanaanLaw, P.C.

(57) ABSTRACT

A rechargeable metal halide battery with an optimized active cathode electrolyte solution has high energy density and does not require charging following fabrication. The optimized active cathode electrolyte solution includes (i) a mixture of a metal halide and its corresponding halogen dissolved in an organic solvent at a concentration ratio greater than 0.5 and (ii) an oxidizing gas. The organic solvent is a nitrile-based compound and/or a heterocyclic compound. Glyme may be added to the organic solvent to improve battery performance.

38 Claims, 4 Drawing Sheets

(51) Int. Cl.
  *H01M 4/66* (2006.01)
  *H01M 10/0569* (2010.01)
  *H01M 10/058* (2010.01)
  *H01M 4/70* (2006.01)

(52) U.S. Cl.
  CPC ........... *H01M 4/70* (2013.01); *H01M 10/058* (2013.01); *H01M 10/0569* (2013.01); *H01M 10/44* (2013.01)

(58) Field of Classification Search
  CPC ......... H01M 2300/0028; H01M 4/382; H01M 4/661; H01M 4/663; H01M 4/70; Y02E 60/10; Y02P 70/50
  See application file for complete search history.

(56) References Cited

U.S. PATENT DOCUMENTS

| | | | |
|---|---|---|---|
| 5,411,820 | A | 5/1995 | Chaloner-Gill |
| 5,567,547 | A | 10/1996 | Golovin et al. |
| 6,632,573 | B1 | 10/2003 | Nimon et al. |
| 6,984,367 | B2 | 1/2006 | Wietelmann et al. |
| 8,658,304 | B2 | 2/2014 | Visco et al. |
| 8,758,947 | B2 | 6/2014 | Zhang et al. |
| 9,490,496 | B2 | 11/2016 | Tennessen et al. |
| 10,224,577 | B2 | 3/2019 | Bhavaraju et al. |
| 2003/0190527 | A1 | 10/2003 | Pugh et al. |
| 2009/0269675 | A1 | 10/2009 | Huang |
| 2012/0028137 | A1 | 2/2012 | Chase et al. |
| 2015/0333353 | A1* | 11/2015 | Yazami ................ H01M 8/188 429/485 |
| 2016/0218394 | A1 | 7/2016 | Yamada et al. |
| 2017/0125868 | A1 | 5/2017 | Kim et al. |
| 2019/0221887 | A1 | 7/2019 | Kim et al. |

FOREIGN PATENT DOCUMENTS

| | | |
|---|---|---|
| KR | 101714126 B1 | 6/2016 |
| KR | 20170059396 A | 5/2017 |
| KR | 20180068117 A | 6/2018 |
| TW | I659010 B | 5/2019 |
| WO | 2014141726 A1 | 9/2014 |

OTHER PUBLICATIONS

Cabana et al., Beyond intercalation-based Li-ion batteries: The state of the art and challenges of electrode materials reacting through conversion reactions, Adv. Mater. 22:E170-E192 (2010).

Etacheri et al., Challenges in the development of advanced Li-ion batteries: a review, Energy Environ. Sci. 4:3243-3262(2011).

Heller, Potentially implantable miniature batteries, Analytical and Bioanalytical Chemistry 385:469-473 (2006).

Karden et al., Energy storage devices for future hybrid electric vehicles, J. Power Sources 168:2-11 (2007).

Nitta et al., Li-ion battery materials: Present and future, Materials Today 18(5):252-264 (2015).

Tarascon & Armand, Issues and challenges facing rechargeable lithium batteries, Nature 414:359-67 (2001).

Xu, Nonaqueous liquid electrolytes for lithium-based rechargeable batteries, Chem. Rev. 104(10): 4303-4417 (2004).

List of IBM Patents or Patent Applications Treated as Related.

U.S. Appl. No. 16/297,369, filed Mar. 8, 2019; Inventor Kim et al.; Applicant/Assignee International Business Machines Corporation.

International Search Report and Written Opinion dated Aug. 3, 2021, for PCT/EP2021/058446, filed on Mar. 31, 2021.

* cited by examiner

LIQUID CATHODE FORMULATION FOR RECHARGEABLE METAL HALIDE BATTERY

The subject matter of this disclosure describes activities undertaken within the scope of a joint research agreement that was in place before the effective date of the instant application. The parties to the joint research agreement are International Business Machines Corporation (Armonk, N.Y., USA) and Central Glass Co., Ltd. (Tokyo, Japan).

TECHNICAL FIELD

The present invention relates generally to rechargeable batteries and, more specifically, to active cathode electrolyte formulations for rechargeable metal halide batteries.

BACKGROUND OF THE INVENTION

Rechargeable batteries are in high demand for a wide range of applications, from small batteries for industrial and medical devices, to larger batteries for electric vehicles and grid energy storage systems. Each application requires a range of electrochemical properties, yet today, battery performance is still considered a limiting factor for satisfying the high standard of the customers.

There are currently two types of rechargeable batteries: batteries that run via electrochemical intercalation/de-intercalation behavior of acting ions, such as lithium ion batteries; and batteries that run via a conversion reaction of active electrode/electrolyte materials, such as nickel metal hydride (NiMH) batteries. The most well-known and widely used rechargeable batteries are lithium-ion batteries that use an intercalated lithium compound as one electrode material, which allows lithium ions to move back and forth in an electrolyte pond. NiMH batteries use nickel hydroxide as a positive electrode, a hydrogen-absorbing alloy as a negative electrode, and an alkaline electrolyte (e.g., potassium hydroxide).

Lithium-ion and NiMH batteries have shortcomings that are preventing them from being used in a wider range of applications. These shortcomings include slow charging speeds and the high cost of the heavy metal cathode materials required to manufacture the batteries.

SUMMARY OF THE INVENTION

The present invention overcomes the shortcomings in the art by providing a rechargeable metal halide battery with an optimized active cathode electrolyte solution.

In one embodiment, the present invention relates to battery comprising: an anode; a cathode current collector; and an electrolyte that facilitates transport of ions between the anode and the cathode current collector, wherein the electrolyte includes: a solvent comprising one or more organic liquid compounds, an active cathode material comprising a mixture of a metal halide and its corresponding halogen, wherein the metal halide to halogen molar concentration ratio is greater than 0.5, the mixture is dissolved in the solvent, and the active cathode material is in contact with the cathode current collector, and an oxidizing gas dissolved in the solvent.

In another embodiment, the present invention relates to an electrolyte for a rechargeable metal halide battery comprising: a solvent comprising one or more organic liquid compounds, an active cathode material comprising a mixture of a metal halide and its corresponding halogen, wherein the metal halide to halogen molar concentration ratio is greater than 0.5, the mixture is dissolved in the solvent, and the active cathode material is in contact with the cathode current collector, and an oxidizing gas dissolved in the solvent.

In a further embodiment, the present invention relates to a rechargeable battery comprising: an anode; a cathode current collector; and an electrolyte that facilitates transport of ions between the anode and the cathode current collector, wherein the electrolyte includes: a mixed-solvent solution comprising a nitrile-based compound and/or a heterocyclic-based compound, an active cathode material comprising a mixture of a lithium iodine (LiI) and iodide ($I_2$), wherein the mixture is dissolved in the mixed-solvent solution, the LiI to $I_2$ molar concentration ratio is in the range of 0.5 to 8, and the active cathode material is in contact with the cathode current collector, and an oxidizing gas dissolved in the solvent.

In one aspect, the present invention relates to a method of preparing an electrolyte for a metal halide rechargeable battery, the method comprising: dissolving a mixture of a metal halide and its corresponding halogen in a solvent comprising a nitrile-based compound and/or a heterocyclic-based compound, wherein the metal halide to halogen molar concentration ratio is greater than 0.5; and introducing an oxidizing gas into the mixed-solvent solution.

In another aspect, the present invention relates to a method of fabricating a metal halide rechargeable battery, the method comprising: dissolving a mixture of LiI and $I_2$ in a solvent to form an electrolyte solution, wherein the solvent comprises a nitrile-based compound and/or a heterocyclic-based compound, and the LiI to $I_2$ molar concentration ratio is in the range of 0.5 to 8; forming a soaked separator by soaking a separator in the electrolyte solution; forming a stack comprising an anode, the soaked separator, and a cathode current collector, wherein the soaked separator is place between the anode and the cathode current collector; and introducing an oxidizing gas into the stack.

In a further aspect, the present invention relates to a method of preparing an electrolyte for a metal halide rechargeable battery, the method comprising: combining a metal halide, the metal halide's corresponding halogen, an oxidizing gas, and a solvent, wherein the solvent comprises a nitrile-based compound and/or a heterocyclic-based compound and the metal halide to halogen molar concentration ratio is greater than 0.5.

In another aspect, the present invention relates to a method of fabricating a metal halide rechargeable battery, the method comprising: forming an electrolyte solution comprising LiI, $I_2$, an oxidizing gas, and a solvent, wherein the solvent comprises a nitrile-based compound and/or a heterocyclic-based compound, and the LiI to $I_2$ molar concentration ratio is in the range of 0.5 to 8; soaking a separator in the electrolyte solution; and forming a stack comprising an anode, the soaked separator, and a cathode current collector, wherein the soaked separator is placed between the anode and the cathode current collector.

In further embodiments and aspects, the metal halide comprises a salt that dissociates into (i) an ion selected from the group consisting of $I^-$, $Br^-$, $Cl^-$, and $F^-$ and (ii) an ion selected from the group consisting of $Li^+$, $Mg^{2+}$, $Al^{3+}$ and $Na^+$.

In other embodiments and aspects, the halogen is a molecular halogen comprising at least one of $I_2$, $Br_2$, $Cl_2$, and $F_2$.

In further embodiments and aspects, the metal halide to halogen have a molar concentration ratio greater than 0.5

In other embodiments and aspects, the metal halide to halogen have a molar concentration ratio in the range of 0.5 to 8.

In further embodiments and aspects, the organic liquid compounds/solvents comprise a nitrile-based compound and/or a heterocyclic-based compound.

In other embodiments and aspects, the nitrile-based compound is methoxypropionitrile (MPN).

In further embodiments and aspects, the heterocyclic-based compound is 1,3-dioxolane (DOL).

In other embodiments and aspects, the organic liquid compounds/solvents further comprise a glyme-based compound.

In further embodiments and aspects, the glyme-based compound is 1,2-dimethoxyethane (DME).

In other embodiments and aspects, the oxidizing gas is selected from the group consisting of oxygen, air, nitric oxide, nitrogen dioxide, and mixtures and combinations thereof.

In further embodiments and aspects, the electrolyte comprises an additional lithium salt selected from the group consisting of lithium nitrate ($LiNO_3$), lithium fluoride (LiF), lithium bis(trifluoromethanesulfonyl)imide (LiTFSI; $LiC_2F_6NO_4S_2$), lithium trifluoromethanesulfonate ($LiCF_3SO_3$), lithium hexafluorophosphate ($LiPF_6$), lithium hexafluoroarsenate ($LiAsF_6$), lithium perchlorate ($LiClO_4$), and lithium tetrafluoroborate ($LiBF_4$).

In other embodiments and aspects, the anode comprises one or more alkali metal and/or one or more alkali earth metal.

In other embodiments and aspects, the anode comprises at least one of Li, Mg, Al, and Na.

In further embodiments and aspects, the cathode current collector comprises a porous carbon material and/or a metal.

In other embodiments and aspects, the porous carbon material is selected from the group consisting of carbon cloth, carbon nanoparticles, polymer binders, and combinations thereof.

In further embodiments and aspects, the metal is selected from the group consisting of stainless steel, copper, nickel, titanium, aluminum, and combinations and alloys thereof.

Additional embodiments and aspects of the invention will be provided, without limitation, in the detailed description of the invention that is set forth below.

DETAILED DESCRIPTION OF THE INVENTION

Figure 1A:
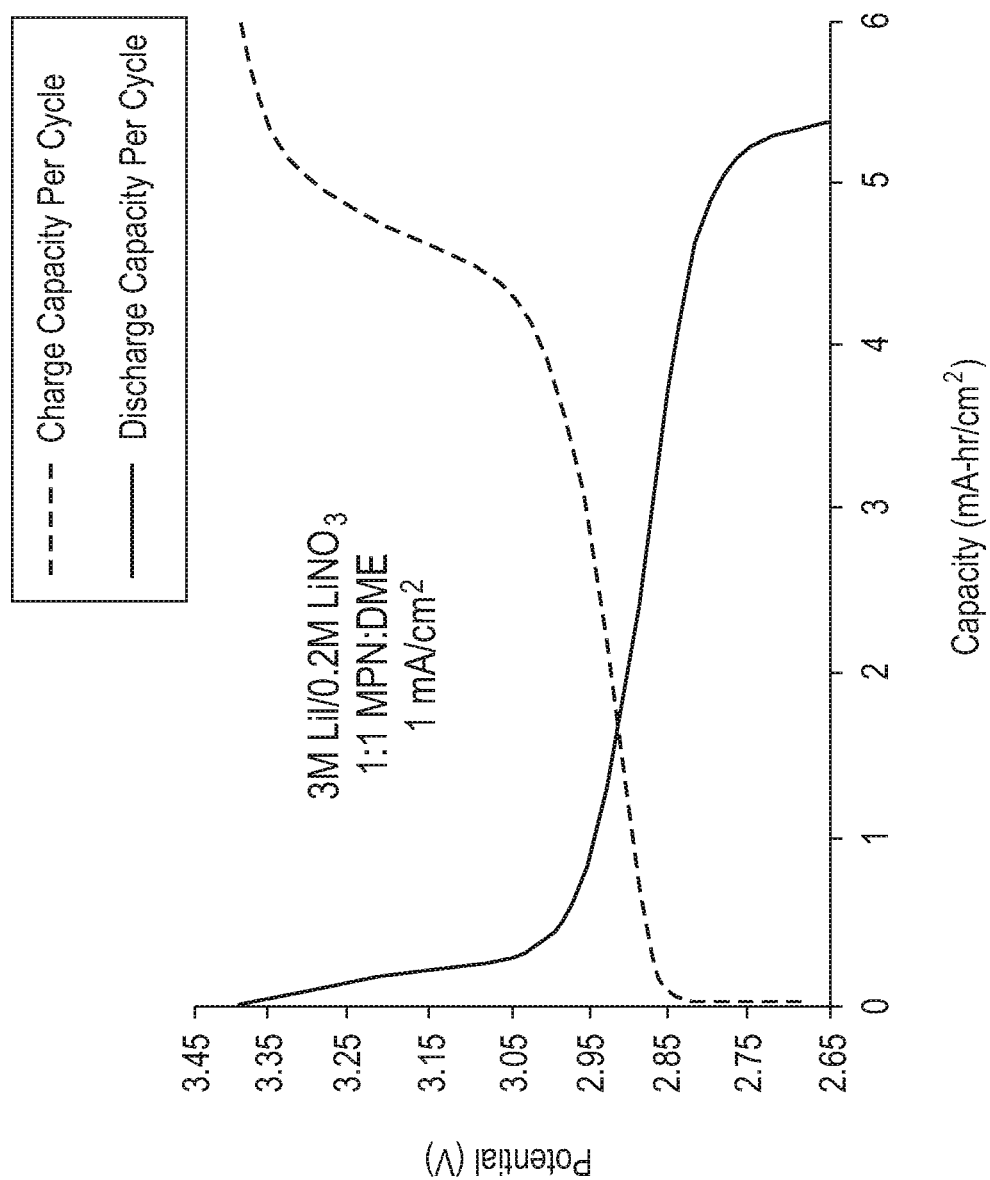
FIGS. 1A-1C are graphs that compare battery cell capacity after 10 cycles for battery cells with 3M effective LiI (lithium iodide) concentrations in the fully discharged state with the following operating electrolytes (formulated in a solvent mixture of 1:1 MPN:DME (methoxypropionitrile: 1,2-dimethoxyethane)) and operating conditions: an LiI-only based electrolyte solution (FIG. 1A); an LiI+iodine ($I_2$) electrolyte solution operated with a $1^{st}$ cycle as a charge cycle (FIG. 1B); and an LiI+$I_2$ electrolyte solution with a $1^{st}$ cycle as a discharge cycle (FIG. 1C).

Set forth below is a description of what are currently believed to be preferred embodiments of the claimed invention. Any alternates or modifications in function, purpose, or structure are intended to be covered by the appended claims.

As used in this specification and the appended claims, the singular forms "a," "an," and "the" include plural referents unless the context clearly dictates otherwise. The terms "comprise," "comprised," "comprises," and/or "comprising," as used in the specification and appended claims, specify the presence of the expressly recited components, elements, features, and/or steps, but do not preclude the presence or addition of one or more other components, elements, features, and/or steps.

As used herein, the term "anode" refers to the negative or reducing electrode of a battery cell that releases electrons to an external circuit and oxidizes during an electrochemical process.

As used herein, the term "cathode" refers to the positive or oxidizing electrode of a battery cell that acquires electrons from the external circuit and is reduced during the electrochemical process.

As used herein, the term "electrolyte" refers to a material that provides ion transport between the anode and cathode of a battery cell. An electrolyte acts as a catalyst for battery conductivity through its interaction with the anode and the cathode. Upon battery charging, an electrolyte promotes the movement of ions from the cathode to the anode and on discharge, the electrolyte promotes the movement of ions from the anode to the cathode.

As used herein, the term "oxidizing gas" refers to a gas that induces a reduction-oxidation (redox) reaction in a redox battery. Examples of oxidizing gases include, without limitation, oxygen, air, nitric oxide, and nitrogen dioxide. As is known to those of skill in the art, a redox reaction is a reaction that transfers electrons between (i) a reducing agent that undergoes oxidation through the loss of electrons and (ii) an oxidizing agent that undergoes reduction through the gain of electrons. A redox battery is a rechargeable electrochemical cell where chemical energy is provided by two electrolytes separated by an ion-exchange membrane. In operation, ion exchange, accompanied by a flow of electric current, occurs through the ion-exchange membrane while the electrolytes circulate in their respective spaces.

As used herein, the term "metal halide" refers to a compound having a metal and a halogen. The metals of metal halides generally include any metal in Groups 1 to 16 of the periodic chart, but will typically be Group 1 alkali metals. The halides of the metal halides will be any halogen in Group 17 of the periodic chart.

As used herein, the terms "nitrile" and "nitrile-based compound" refer to an organic chemical that contains at least one cyano functional group in which the carbon and nitrogen atoms have a triple bond, i.e., C≡N⁻. Examples of nitriles include, without limitation, acetonitrile, acrylonitrile, propionitrile, methoxyacetonitrile, methoxypropionitrile (MPN), propylnitrile, cyclopentanecarnonitnie, 4-cyanobenzaldehyde, and ethylene glycol bis(propionitrile) (EGBP). Like glymes, nitriles are chemically inert, aptotic polar solvents.

As used herein, the term "heterocyclic compounds" is used in its traditional sense to refer to a ring-structured chemical compound that has at least two different elements as members of its ring. As is known to those of skill in the art, the list of heterocyclic compounds is too extensive to list; thus, for purposes of this disclosure, the following list provides three examples of saturated and unsaturated heterocyclic compounds having nitrogen, oxygen, and sulfur as heteroatoms. It is understood that this list of heterocyclic compounds is intended to be exemplary and not limiting.

Examples of saturated 3-atom rings include, without limitation, aziridine, oxirane, and thiirane. Examples of unsaturated 3-atom rings include, without limitation, azirine, oxirene, and thiireen. Examples of saturated 4-atom rings include, without limitation, azetidine, oxetane, and thietane. Examples of unsaturated 4-atom rings include, without limitation, azete, oxete, and thiete. Examples of saturated 5-atom rings include, without limitation, pyrrolidine, oxolane, and thioiane. Examples of unsaturated 5-atom rings include, without limitation, pyrrole, furan, and thiophene. Examples of saturated 6-atom rings include, without limitation, piperidine, oxane, and thiane. Examples of unsaturated 6-atom tings include, without limitation, pyridine, pyran, and thiopyran. Examples of saturated 7-atom rings include, without limitation, azepane, oxepane, and thiepane. Examples of unsaturated 7-atom rings include, without limitation, azepine, oxepine, and thiepine. Examples of saturated 8-atom rings include, without limitation, azocane, oxocane, and thiocane. Examples of unsaturated 8-atom rings include, without limitation, azocine, oxocine, and thiocine. Examples of saturated 9-atom rings include, without limitation, azonane, oxonane, and thionane. Examples of unsaturated 9-atom rings include, without limitation, azonine, oxonine, and thionine. One exemplary, but not limiting, heterocyclic used herein is 1,3-dioxolane (DOL).

Metal halide batteries are redox batteries that use metal halide as an active cathode material in the presence of an oxidizing gas. Unlike lithium-ion and NiMH batteries, metal halide batteries are not manufactured with heavy metals; thus, metal halide batteries have potentially lower manufacturing costs than traditional lithium ion or NiMH batteries. In order to be suitable replacements for lithium-ion and NiMH batteries, metal halide batteries require optimization.

As used herein, the terms "glyme" and "glyme-based compound" refer to a glycol ether class of solvents that do not carry free hydroxyl groups. Due to their lack of functional groups, glyme solvents are chemically inert and aprotic (lacking H atoms/incapable of H-bonding) polar solvents. Glymes have the general chemical formula: $R^1O-(CR_2^2C\ R_2^2O)_n-C\ R^1$. Examples of glyme solvents include, without limitations, 1,2-dimethoxyethane (DME), 1,2-diethoxyethane, 2-methoxyethyl ether (diglyme), 1,2-bis(2-methoxyethoxy)ethane (triglyme), and bis[2-(2-methoxyethoxy)ethyl] ether (tetraglyme).

Described herein is a battery comprising an anode, an electrolyte, and a cathode current collector in contact with an active cathode material, wherein the electrolyte comprises (i) a solvent comprising one or more organic liquid compounds; (ii) a mixture of a metal halide and its corresponding halogen, wherein the mixture functions as the active cathode material and the mixture is dissolved in the solvent, and (iii) an oxidizing gas also dissolved in the solvent.

In one embodiment, the metal halide and its corresponding halogen are dissolved in the solvent prior to the introduction of the oxidizing gas. In another embodiment, the metal halide, its corresponding halogen, and the oxidizing gas are introduced together into the solvent. In a further embodiment, the metal halide, its corresponding halogen, the oxidizing gas, and the solvent are combined together to form the electrolyte solution.

Solvents that may be used to prepare the electrolyte formulations described herein, include, without limitation, a nitrile, a heterocyclic compound, and a glyme. In one embodiment, the solvent comprises a nitrile and a glyme. In another embodiment, the solvent comprises a heterocyclic compound with a glyme. In a further embodiment, the solvent comprises a nitrile and a heterocyclic compound. In another embodiment, the solvent comprises a nitrile, a heterocyclic compound, and a glyme.

Metal halides that may be used to prepare the electrolyte formulations described herein include any metal halide that comprises a salt that dissociates into: (i) an ion selected from the group consisting of $Y^-$, $Br^-$, $Cl^-$, and $F^-$; and (ii) an ion selected from the group consisting of $Li^+$, $Mg^{2+}$, $Al^{3+}$, and $Na^+$. The halogen may be any molecular halogen that comprises at least one of $I_2$, $Br_2$, $Cl_2$, and $F_2$. In one embodiment, the molar concentration ratio of the metal halide to the halogen will be greater than 0.5. In another embodiment, the molar concentration ratio will be in the range of 0.5 to 8. In a further embodiment, the molar concentration ratio will be approximately 1. Solely for purposes of illustration, and without intending to be limiting, the metal halide, LiI, and the halogen, $I_2$, will be described herein as an exemplary mixture for the active cathode material.

Oxidizing gases that may be used for the electrolyte include, without limitation, oxygen, air, nitric oxide, nitrogen dioxide, and mixtures and combinations thereof.

In a further embodiment, the electrolyte may include one or more lithium salts (in addition to LiI). Examples of such additional lithium salts include, without limitation, lithium nitrate ($LiNO_3$), lithium fluoride (LiF), lithium bis(trifluoromethanesulfonyl)imide (LiTFSI; $LiC_2F_6NO_4S_2$), lithium trifluoromethanesulfonate ($LiCF_3SO_3$), lithium hexafluorophosphate ($LiPF_6$), lithium hexafluoroarsenate ($LiAsF_6$), lithium perchlorate ($LiClO_4$), and lithium tetrafluoroborate ($LiBF_4$).

Examples of materials that may be used for the anodes of the rechargeable batteries described herein include, without limitation, one or more alkali metals and/or one or more alkali earth metals. In one embodiment, the anode comprises at least one of Li, Mg, Al, and Na.

Examples of materials that may be used for the cathode current collectors of the rechargeable batteries include, without limitation, porous carbon materials and compatible metals.

Examples of porous carbon materials include, without limitation, carbon cloth, carbon nanoparticles, polymer binders, and combinations thereof. Examples of compatible metals include, without limitation, stainless steel, copper, nickel, titanium, aluminum, and combinations and alloys thereof.

As will be appreciated by those of skill in the art, the batteries described herein will be manufactured for sale in a cell package. Examples of such cell packages include, without limitation, pouch cells, cylindrical cells, prismatic cells, coin cells, and SWAGELOK® cells (Swagelok Company, Solon, Ohio, USA).

The liquid active cathode material described herein increases metal-halide solubility without significantly increasing electrolyte viscosity, resulting in a metal halide battery with improved energy density compared with conventional metal halide batteries. This high energy density of the metal halide battery is accomplished through active cathode material formulations that include a mixture of a metal halide and the metal halide's corresponding halogen, in the presence of an oxidizing gas. The combination of molecular halogen and metal halide as active cathode materials reduces the manufacturing costs of the high energy density metal halide batteries described herein because molecular halogen is a lower cost material than metal-halide salts.

Figure 1B:
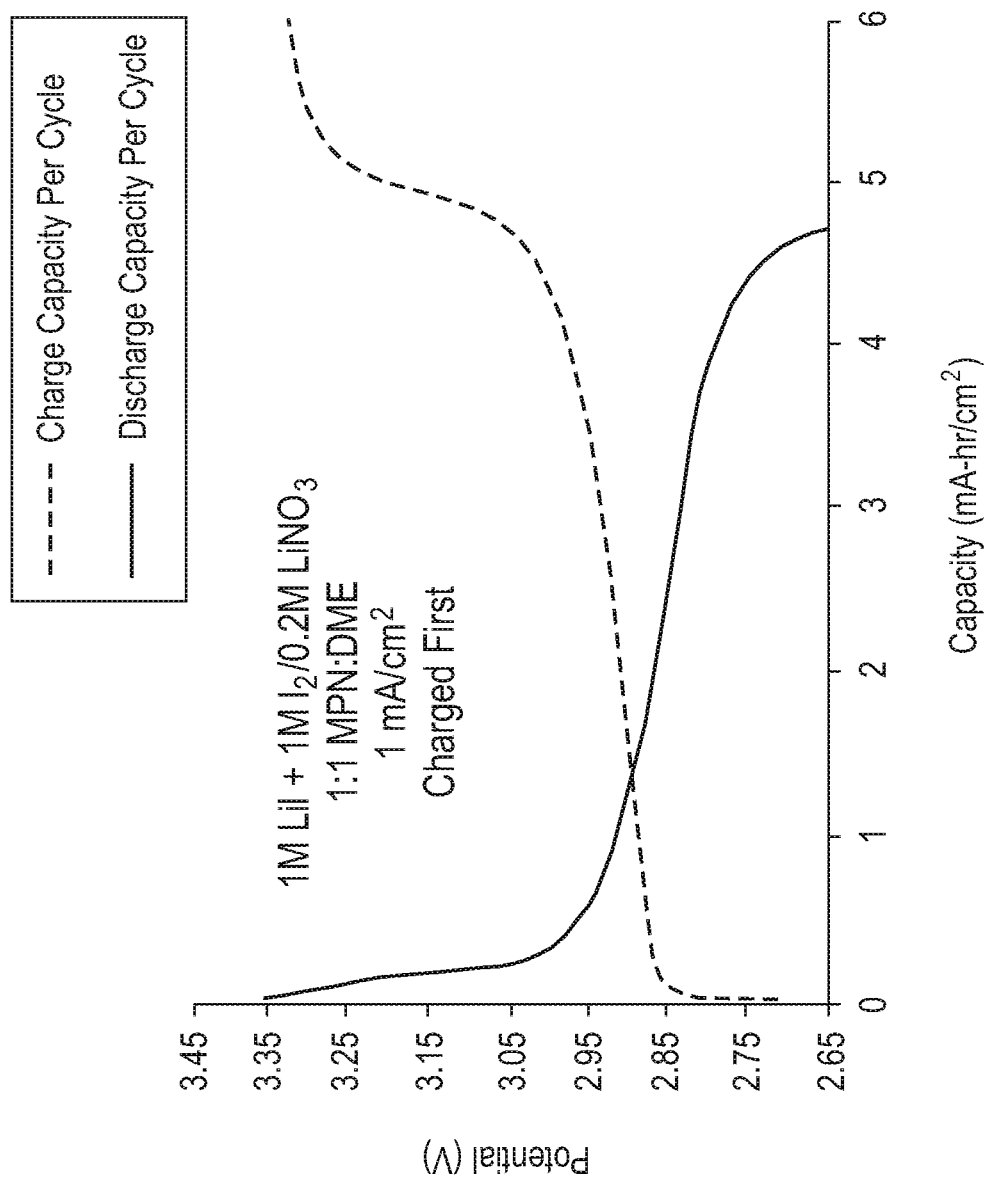
Figure 1C:
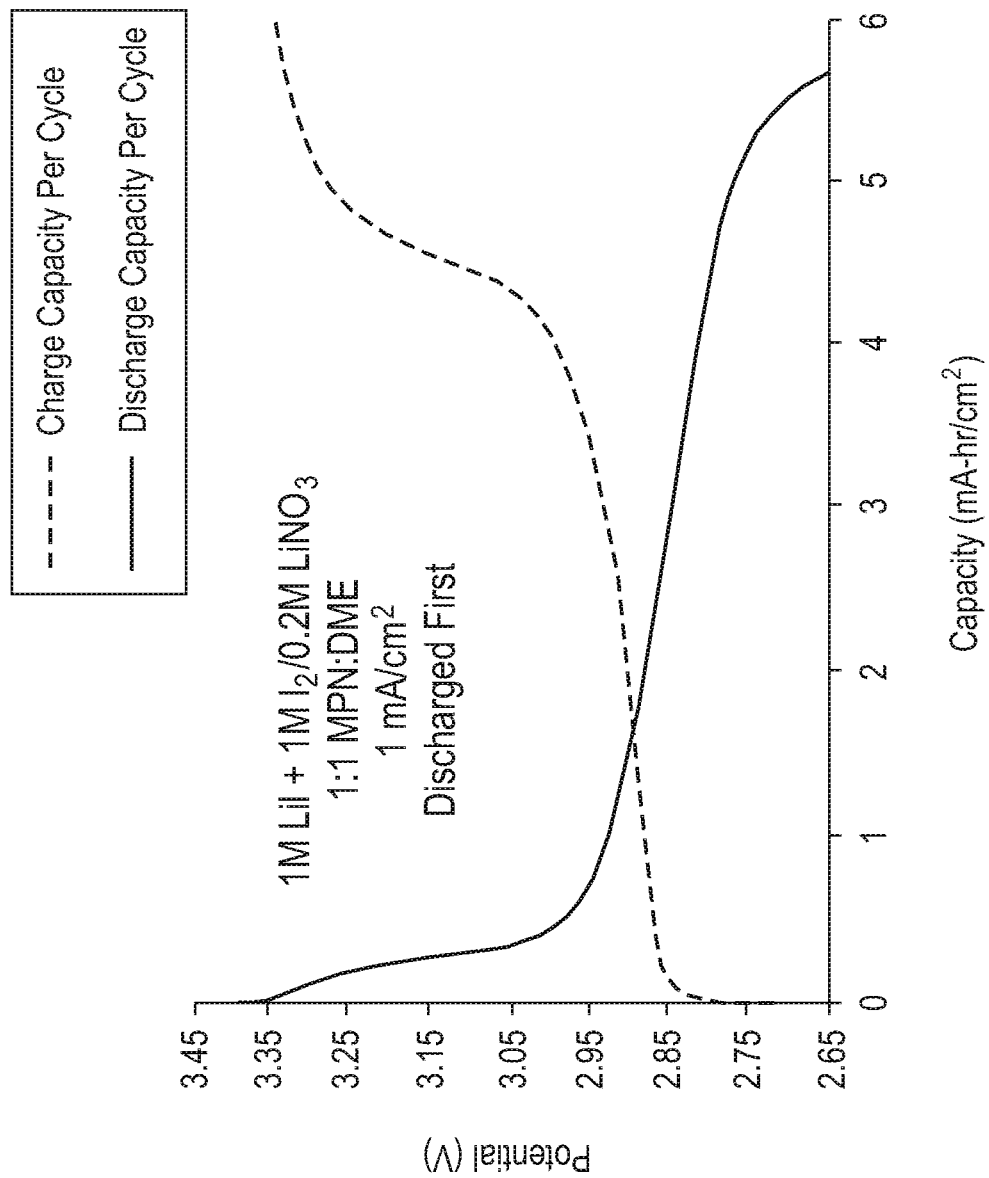

Example 1 describes the general procedure for cell fabrication using an active cathode electrolyte solution comprising (i) the mixed-solvent solution of the nitrile, methoxypropionitrile (MPN), and the glyme, 1,2-dimethoxyethane (DME), in a 1:1 volume ratio and (ii) LiI or LiI+$I_2$ as active cathode materials. FIGS. 1A-1C and Table 1 show the discharge capacity performance after ten cycles of three metal halide battery cells fabricated according to the procedure in Example 1 with the following effective molar concentrations of the active cathode materials and discharge conditions: 3 M LiI only (FIG. 1A); 1 M LiI+1 M $I_2$ first cycle charged (FIG. 1B); and 1 M LiI+1 M $I_2$ first cycle discharged (FIG. 1C). FIGS. 1B and 1C also include the discharge conditions for the tests, with FIG. 1B showing the discharge capacity performance of a battery that was charged following fabrication and FIG. 1C showing the discharge capacity performance of a battery that was discharged following fabrication without an initial charging. All batteries were tested with 1 mA/$cm^2$ current density. As shown in FIGS. 1A-1C and Table 1, battery cells fabricated with the Li+$I_2$ active cathode material performed better than battery cells fabricated with LiI alone. The data further show that the battery cells fabricated with the LiI+$I_2$ active cathode material showed a higher discharge capacity after ten cycles (5.67 mA-hr/$cm^2$) when the first cycle was a discharge cycle versus when the first cycle was a charge cycle (4.71 mA-hr/$cm^2$). These data show that unlike conventional metal halide batteries, battery cells fabricated with an active cathode formulation comprising a metal halide and its corresponding molecular halogen can be discharged immediately following fabrication without an initial charge cycle.

TABLE 1

| ACTIVE CATHODE MATERIAL FORMULATION | DISCHARGE CAPACITY AT CYCLE 10 (mA-hr/$cm^2$) |
|---|---|
| 3M LiI | 5.36 |
| 1M LiI + 1M $I_2$ $1^{st}$ cycle charge | 4.71 |
| 1M LiI + 1M $I_2$ $1^{st}$ cycle discharge | 5.67 |

Example 2 describes the procedure used to test the viscosity of the metal-halide/molecular halogen active cathode materials described herein in a mixed-solvent solution. As shown in Table 2, when LiI is the sole active cathode material in an organic electrolyte solution, the viscosity of the electrolyte solution increases as the LiI amount increases (Tests 1 and 2). When the viscosity of comparable electrolyte solutions comprising LiI+$I_2$ are tested, the LiI+$I_2$ electrolyte solutions have the same viscosity as the LiI-only electrolyte solutions (Tests 5 and 6). The results of Table 2 show that the introduction of a corresponding molecular halogen into a metal halide active cathode electrolyte formulation has no effect on the viscosity of the electrolyte solution. Due to the molecular mass difference between metal halide and molecular halogen, the substitution of molecular halogen for some of the metal halide within a battery cell leads to an increase in the amount of active cathode material that can be loaded within the battery during fabrication. The resultant increase in active cathode material without a corresponding increase in viscosity results in a battery with improved volumetric energy density and increased charge transport kinetics over conventional metal halide batteries.

TABLE 2

| TEST # | IODINE ($I_2$, M) | LITHIUM IODIDE (LiI, M) | VISCOSITY (CP) |
|---|---|---|---|
| 1 | 0 | 0.5 | 1.32 |
| 2 | 0 | 1 | 2.06 |
| 3 | 0.5 | 0 | 0.95 |
| 4 | 1 | 0 | 1.07 |
| 5 | 0.5 | 0.5 | 1.36 |
| 6 | 1 | 1 | 2.06 |

Figure 2:
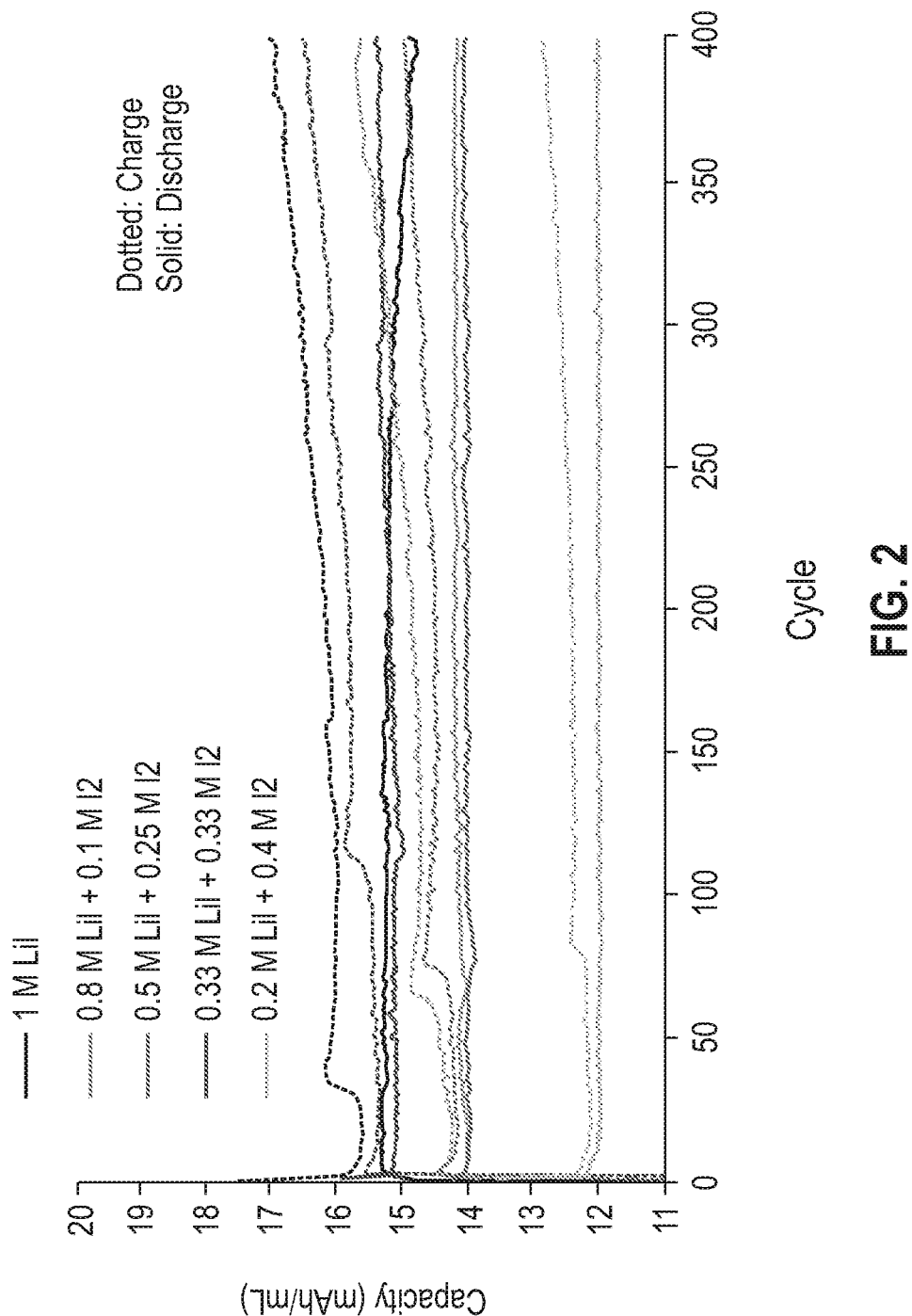
FIG. 2 is a graph that compares battery cell charge capacity (dotted lines) and discharge capacity (solid lines) over 400 cycles with five different electrolyte solutions formulated in a solvent mixture of 1:1 DOL:DME (1,3-dioxolane:methoxypropionitrile) with different mixtures of LiI and $I_2$.

FIG. 2 shows charge/discharge capacity over 400 cycles for metal halide battery cells fabricated with the following LiI+$I_2$ active cathode formulations: 0.8 M LiI+0.1 M $I_2$; 0.5 M LiI+0.25 M $I_2$; 0.33 M LiI+0.33 M $I_2$; 0.2 M LiI+0.4 M $I_2$; and 1M LiI as the control. As shown in FIG. 2, metal halide battery cells fabricated with an LiI cathode formulation having equimolar concentrations of LiI and $I_2$ (0.33 M LiI+0.33 M $I_2$) retain the same discharge capacity over 250 cycles as the control battery (1M LiI). Table 3 provides the molar concentration range ratio of LiI to $I_2$ based upon the data in FIG. 2. As shown in Table 3, the batteries described herein operate in a metal-halide to halogen molar concentration ratio ranging from 0.5 to infinity. Within the context of the LiI+$I_2$ battery of Table 3, $I_2$>0. More generally, for the metal halide/halogen batteries described herein, the halogen molar concentration may approach, but not equal zero (halogen>0). Since the commercial cost of metal halide salts is much higher than that of molecular halogen, battery cells fabricated with an active cathode electrolyte formulation having a metal halide and molecular halogen have cost savings over conventional metal halide batteries.

TABLE 3

| LiI AND $I_2$ MOLAR CONCENTRATIONS | LiI/$I_2$ |
|---|---|
| 1M LiI | ∞ |
| 0.8M LiI + 0.1M $I_2$ | 8 |
| 0.5M LiI + 0.25M $I_2$ | 2 |
| 0.33M LiI + 0.33M $I_2$ (charging first) | 1 |
| 0.33M LiI + 0.33M $I_2$ (discharging first) | 1 |
| 0.2M LiI + 0.4M $I_2$ | 0.5 |

Example 3 describes the procedure used to test the solubility of the metal-halide/molecular halogen active cathode materials described herein in a mixed-solvent solution. As shown in Table 4, the maximum solubility of LiI alone in a solvent solution of 1:1 MNP:DME was 5M; however, when $I_2$ was added to the solution, the maximum solubility of the LiI increased to 7M, demonstrating a synergistic effect between the LiI and $I_2$ in the mixed-solvent electrolyte solution.

TABLE 4

| ACTIVE CATHODE MATERIAL | LiI SOLUBILITY LIMIT (M) | IODINE ($I_2$) SOLUBILITY LIMIT (M) | EFFECTIVE IODIDE ($I^-$) CONCENTRATION IN FULLY DISCHARGED STATE (M) |
|---|---|---|---|
| Iodine Only | — | 3.0 | 6.0 |
| Lithium Iodide Only | 5.0 | — | 5.0 |
| Lithium Iodide + Iodine | 7.0 | 3.0 | 13.0 |

With reference to Table 4, the effective iodide ($I^-$) concentration in the battery in a fully discharged state ($I^-$) is $I^- = LiI + 2I_2$. With 7M LiI and 3M $I_2$ as active cathode materials, in the fully discharged state, the iodide concentration in the electrolyte is 13M $I^-$—an effective iodide concentration that is more than twice the iodide concentration achieved from batteries having active cathode materials of LiI or $I_2$ alone. Intermediate products of the reaction between 7M LiI and 3M $I_2$ are 3M tri-iodide ($I_3^-$; a charge product) and 4M $I^-$ (a discharge product). The chemical species contributing to the high discharge capacity of the metal halide battery is the presence of the charge product (i.e., the $I_3^-$) in the electrolyte solution. Thus, for a battery cell fabricated with an optimized concentration of LiI+$I_2$ in an electrolyte solution, the presence of $I_3^-$ ions in the electrolyte solution results in a battery that does not need to be charged prior to use. The results of Table 4 demonstrate that the formulation of electrolyte solutions with stoichiometric amounts of a metal halide and its corresponding halogen in an organic solvent solution allows for the optimization of the electrolyte for the solubility of the chemical species that is contributing to the discharge capacity.

The metal-halide/molecular halogen active cathode electrolyte materials described herein have the following improvements over conventional metal halide batteries: lower manufacturing costs, higher loading capacity, higher energy density, higher charge transport kinetics, and discharge capability immediately following fabrication.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

EXPERIMENTAL

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

Example 1

General Procedure for Cell Fabrication

LiI and $I_2$ were used as active cathode materials for cell fabrication. The LiI was placed in a vial and dried on a hot plate inside an argon filled glovebox (<0.1 ppm $H_2O$, $O_2$) at 120° C. for over 12 hours. $I_2$ was used as received. A glyme-based compound (DME), a nitrile-based compound (MPN), and a heterocyclic compound (1,3-dioxolane) were stored in separate vials with 20 mg of molecular sieve (4 Å) overnight. Next, a mixed-solvent solution was prepared with the following compounds in a 1:1 volume ratio: (i) DME and MPN, and (ii) DME and 1,3-dioxolane. For testing, LiI alone, $I_2$ alone, or a mixture of LiI and $I_2$ was dissolved in the mixed-solvent solutions at predetermined molar ratios to form the active cathode electrolyte solutions. Each electrolyte solution was then used to wet both a quartz filter separator and a cathode current collector, the latter of which consisted of carbon cloth, carbon nanoparticles, and a polymer binder. The active cathode material was placed in constant contact with the carbon cathode current collector and the electrolyte solutions. All cell assembly was carried out in a glovebox. A lithium metal foil anode, the electrolyte wetted separator, and the wetted carbon current collector were placed, in order, within a Swagelok-type cell equipped with both inlet and outlet tubing for oxygen flow. Oxygen gas was introduced from the inlet tubing, purged, and completely replaced the argon gas inside the cell.

Example 2

Effect of Iodine Active Material Formulation on Electrolyte Viscosity

Following the cell fabrication procedure of Example 1, the viscosity of six different liquid cathode formulations was tested. As provided in Table 2, the following six mixtures of LiI, $I_2$, and LiI+$I_2$ were prepared in a 30 mL solvent mixture of 1:1 MPN:DME (v/v): (1) 0.5M $I_2$; (2) 1M $I_2$; (3) 0.5M LiI; (4) 1M LiI; (5) 0.5M $I_2$+0.5M LiI; and (6) 1M $I_2$+1M LiI. The viscosity of the solutions for the six tests was measured using a SEKONIC® VM-100A-L torsional oscillation (Kabushiki Kaisha Sekonic Corporation, Tokyo, JP).

Example 3

Effect of Iodine Active Material Formulation on Total Mass Loading

A mixed-solvent solution of 50:50 MPN:DME:(v/v) was prepared as provided in Example 1 and separated into three 1 mL volumes. To test for active cathode material solubility, the following three active cathode materials were individually added to the three 1 mL volumes of the mixed-solvent solution: 5 mM LiI; 3 mM $I_2$; and 7 mM LiI+3 mM $I_2$. The results of the solubility test are shown in Table 4.

We claim:

1. A battery, comprising:
   an anode;
   a cathode current collector; and
   an electrolyte that facilitates transport of ions between the anode and cathode, wherein the electrolyte includes:
   a solvent comprising one or more organic liquid compounds,
   an active cathode material comprising a mixture of a metal halide and its corresponding halogen, wherein the metal halide to halogen molar concentration ratio is greater than 0.5, the mixture is dissolved in the solvent, and the active cathode material is in contact with the cathode current collector, and
   an oxidizing gas dissolved in the solvent.

2. The battery of claim 1, wherein the metal halide comprises a salt that dissociates into (i) an ion selected from the group consisting of $I^-$, $Br^-$, $Cl^-$, and $F^-$ and (ii) an ion selected from the group consisting of $Li^+$, $Mg^{2+}$, $Al^{3+}$ and $Na^+$.

3. The battery of claim 1, wherein the halogen is a molecular halogen selected from the group consisting of $I_2$, $Br_2$, $Cl_2$, or $F_2$, and combinations thereof.

4. The battery of claim 1, wherein the one or more organic liquid compounds comprise a nitrile and/or a heterocyclic compound.

5. The battery of claim 4, wherein the one or more organic liquid compounds comprise a glyme.

6. The battery of claim 1, wherein the metal halide to halogen molar concentration ratio is in the range of 0.5 to 8.

7. The battery of claim 1, wherein the anode comprises one or more alkali metals and/or one or more alkali earth metals.

8. The battery of claim 2, wherein the anode is selected from the group consisting of Li, Mg, Al, Na, and combinations thereof.

9. The battery of claim 1, wherein the cathode current collector comprises a porous carbon material and/or a metal.

10. The battery of claim 1, wherein the oxidizing gas is selected from the group consisting of oxygen, air, nitric oxide, nitrogen dioxide, and mixtures and combinations thereof.

11. An electrolyte for a rechargeable metal halide battery comprising:
    a solvent comprising one or more organic liquid compounds,
    an active cathode material comprising a mixture of a metal halide and its corresponding halogen, wherein the metal halide to halogen molar concentration ratio is greater than 0.5 and the mixture is dissolved in the solvent; and
    an oxidizing gas dissolved in the solvent.

12. The electrolyte of claim 11, wherein the metal halide comprises a salt that dissociates into (i) an ion selected from the group consisting of $I^-$, $Br^-$, $Cl^-$, and $F^-$ and (ii) an ion selected from the group consisting of $Li^+$, $Mg^{2+}$, $Al^{3+}$, and $Na^+$.

13. The electrolyte of claim 11, wherein the halogen is a molecular halogen selected from the group consisting of $I_2$, $Br_2$, $Cl_2$, $F_2$, and combinations thereof.

14. The electrolyte of claim 11, wherein the organic solvent comprises a nitrile and/or a heterocyclic compound.

15. The electrolyte of claim 14, wherein the organic liquid compound comprises a glyme.

16. The electrolyte of claim 11, wherein the metal halide to halogen molar concentration ratio is in the range of 0.5 to 8.

17. The electrolyte of claim 11, wherein the oxidizing gas is selected from the group consisting of oxygen, air, nitric oxide, nitrogen dioxide, and mixtures and combinations thereof.

18. A rechargeable battery, comprising:
    an anode;
    a cathode current collector; and
    an electrolyte that facilitates transport of ions between the anode and the cathode current collector, wherein the electrolyte includes:
    a mixed-solvent solution comprising a nitrile-based compound and/or a heterocyclic-based compound,
    an active cathode material comprising a mixture of a LiI and $I_2$, wherein the mixture is dissolved in the mixed-solvent solution, the LiI to $I_2$ molar concentration ratio is in a range of 0.5 to 8, and the active cathode material is in contact with the cathode current collector, and
    an oxidizing gas dissolved in the solvent.

19. The rechargeable battery of claim 18, wherein the nitrile-based compound is methoxypropionitrile and the heterocyclic-based compound is 1,3-dioxolane.

20. The rechargeable battery of claim 18, wherein the mixed-solvent solution comprises a glyme-based compound.

21. The rechargeable battery of claim 20, wherein the glyme-based compound is 1,2-dimethoxyethane.

22. The rechargeable battery of claim 18, wherein the electrolyte comprises an additional lithium salt selected from the group consisting of lithium nitrate ($LiNO_3$), lithium fluoride (LiF), lithium bis(trifluoromethanesulfonyl)imide (LiTFSI; $LiC_2F_6NO_4S_2$), lithium trifluoromethanesulfonate ($LiCF_3SO_3$), lithium hexafluorophosphate ($LiPF_6$), lithium hexafluoroarsenate ($LiAsF_6$), lithium perchlorate ($LiClO_4$), and lithium tetrafluoroborate ($LiBF_4$).

23. The rechargeable battery of claim 18, wherein the anode comprises Li.

24. The rechargeable battery of claim 18, wherein the cathode current collector comprises a porous carbon material and/or a metal.

25. The rechargeable battery of claim 18, wherein the oxidizing gas is selected from the group consisting of oxygen, air, nitric oxide, nitrogen dioxide, and mixtures and combinations thereof.

26. A method of preparing an electrolyte for a metal halide rechargeable battery, the method comprising:
    dissolving a metal halide and its corresponding halogen in a solvent comprising a nitrile-based compound and/or a heterocyclic-based compound, wherein the metal halide to halogen molar concentration ratio is greater than 0.5; and
    introducing an oxidizing gas into the solvent.

27. The method of claim 26, wherein the metal halide comprises a salt that dissociates into (i) an ion selected from the group consisting of $I^-$, $Br^-$, $Cl^-$, and $F^-$ and (ii) an ion selected from the group consisting of $Li^+$, $Mg^{2+}$, $Al^{3+}$ and $Na^+$.

28. The method of claim 26, wherein the halogen is a molecular halogen selected from the group consisting of $I_2$, $Br_2$, $Cl_2$, $F_2$, and combinations thereof.

29. The method of claim 26, wherein the nitrile-based compound is methoxypropionitrile and the heterocyclic-based compound is 1,3-dioxolane.

30. The method of claim 26, wherein the mixed-solvent solution comprises a glyme-based compound.

31. The method of claim 26, wherein the glyme-based compound is 1,2-dimethoxyethane.

32. The method of claim 26, wherein the oxidizing gas is selected from the group consisting of oxygen, air, nitric oxide, nitrogen dioxide, and mixtures and combinations thereof.

33. A method of fabricating a metal halide rechargeable battery, the method comprising:
- dissolving LiI and $I_2$ in a solvent to form an electrolyte solution, wherein the solvent comprises a nitrile-based compound and/or a heterocyclic-based compound, and the LiI to $I_2$ molar concentration ratio is in a range of 0.5 to 8;
- soaking a separator in the electrolyte solution;
- forming a stack comprising an anode, the soaked separator, and a cathode current collector, wherein the soaked separator is placed between the anode and the cathode current collector; and
- introducing an oxidizing gas into the stack.

34. The method of claim 33, wherein the nitrile-based compound is methoxypropionitrile and the heterocyclic-based compound is 1,3-dioxolane.

35. The method of claim 33, wherein the solvent comprises a glyme-based compound.

36. The method of claim 35, wherein the glyme-based compound is 1,2-dimethoxyethane.

37. A method of preparing an electrolyte for a metal halide rechargeable battery, the method comprising:
- combining a metal halide, the metal halide's corresponding halogen, an oxidizing gas, and a solvent, wherein the solvent comprises a nitrile-based compound and/or a heterocyclic-based compound and the metal halide to halogen molar concentration ratio is greater than 0.5.

38. A method of fabricating a metal halide rechargeable battery, the method comprising:
- forming an electrolyte solution comprising LiI, $I_2$, an oxidizing gas, and a solvent, wherein the solvent comprises a nitrile-based compound and/or a heterocyclic-based compound, and the LiI to $I_2$ molar concentration ratio is in a range of 0.5 to 8;
- soaking a separator in the electrolyte solution; and
- forming a stack comprising an anode, the soaked separator, and a cathode current collector, wherein the soaked separator is placed between the anode and the cathode current collector.

* * * * *